(12) United States Patent
Mancini et al.

(10) Patent No.: US 8,171,735 B2
(45) Date of Patent: May 8, 2012

(54) MIXER ASSEMBLY FOR GAS TURBINE ENGINE COMBUSTOR

(75) Inventors: Alfred Albert Mancini, Cincinnati, OH (US); Hukam Chand Mongia, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/979,456

(22) Filed: Dec. 28, 2010

(65) Prior Publication Data

US 2011/0088401 A1 Apr. 21, 2011

Related U.S. Application Data

(63) Continuation of application No. 11/312,728, filed on Dec. 20, 2005, now Pat. No. 7,878,000.

(51) Int. Cl.
*F02C 1/00* (2006.01)
*F02G 3/00* (2006.01)

(52) U.S. Cl. ............... 60/748; 60/737; 60/740; 60/739

(58) Field of Classification Search .................... 60/737, 60/748, 742, 740, 746, 747, 739
See application file for complete search history.

(56) References Cited

U.S. PATENT DOCUMENTS

| | | |
|---|---|---|
| 3,937,011 A | 2/1976 | Caruel et al. |
| 4,023,351 A | 5/1977 | Beyler et al. |
| 4,222,243 A | 9/1980 | Mobsby |
| 4,260,367 A | 4/1981 | Markowski et al. |
| 5,014,918 A | 5/1991 | Halvorsen |
| 5,224,333 A | 7/1993 | Bretz et al. |
| 5,505,045 A | 4/1996 | Lee et al. |
| 5,540,056 A * | 7/1996 | Heberling et al. .............. 60/737 |
| 5,778,676 A | 7/1998 | Joshi et al. |
| 5,983,642 A | 11/1999 | Parker et al. |
| 6,272,840 B1 | 8/2001 | Crocker et al. |
| 6,354,072 B1 | 3/2002 | Hura |
| 6,363,726 B1 | 4/2002 | Durbin et al. |
| 6,367,262 B1 | 4/2002 | Mongia et al. |
| 6,381,964 B1 | 5/2002 | Pritchard, Jr. et al. |
| 6,389,815 B1 | 5/2002 | Hura et al. |
| 6,405,523 B1 | 6/2002 | Foust et al. |
| 6,418,726 B1 | 7/2002 | Foust et al. |
| 6,453,660 B1 | 9/2002 | Johnson et al. |
| 6,484,489 B1 | 11/2002 | Foust et al. |
| 6,622,488 B2 | 9/2003 | Mansour et al. |
| 6,865,889 B2 | 3/2005 | Mancini et al. |
| 6,959,535 B2 | 11/2005 | Mancini et al. |
| 6,986,255 B2 | 1/2006 | Smith et al. |
| 7,065,972 B2 | 6/2006 | Zupanc et al. |
| 7,434,401 B2 | 10/2008 | Hayashi |

(Continued)

*Primary Examiner* — William H Rodriguez
(74) *Attorney, Agent, or Firm* — David J. Clement; Trego, Hines & Ladenheim, PLLC

(57) ABSTRACT

A mixer for a gas turbine engine combustor includes: (a) a primary fuel injector with upstream and downstream ends, the primary fuel injector including: (1) a hollow central portion configured to pass a first air stream; (2) an annular fuel passage at the downstream end, configured to discharge an annular first fuel stream surrounding the first air stream; (b) an annular splitter surrounding the primary fuel injector, configured to pass a second air stream surrounding the first fuel stream; (c) an annular first housing surrounding the splitter, and having an exit positioned axially downstream of the primary fuel injector and the splitter; and (d) fuel injection ports disposed in an array outside the first housing, and disposed in communication with a fuel supply and positioned to discharge a second fuel stream into a third air stream at a position axially upstream of the exit of the first housing.

11 Claims, 7 Drawing Sheets

U.S. PATENT DOCUMENTS

| | | |
|---|---|---|
| 7,464,553 B2 | 12/2008 | Hsieh et al. |
| 7,565,803 B2 | 7/2009 | Li et al. |
| 7,581,396 B2 | 9/2009 | Hsieh et al. |
| 7,762,073 B2 * | 7/2010 | Li et al. .................... 60/748 |
| 7,878,000 B2 * | 2/2011 | Mancini et al. ............ 60/740 |
| 7,942,003 B2 * | 5/2011 | Baudoin et al. ............ 60/748 |
| 8,001,761 B2 * | 8/2011 | Myers et al. ............ 60/39.281 |
| 8,001,786 B2 * | 8/2011 | Oda et al. .................. 60/749 |
| 2002/0162333 A1 | 11/2002 | Zelina |
| 2002/0178732 A1 | 12/2002 | Foust et al. |
| 2007/0028595 A1 | 2/2007 | Mongia et al. |
| 2007/0137207 A1 | 6/2007 | Mancini et al. |
| 2007/0271927 A1 | 11/2007 | Myers et al. |
| 2007/0289305 A1 | 12/2007 | Oda et al. |
| 2008/0173019 A1 | 7/2008 | Kobayashi et al. |
| 2008/0236165 A1 | 10/2008 | Baudoin et al. |

* cited by examiner

MIXER ASSEMBLY FOR GAS TURBINE ENGINE COMBUSTOR

CROSS-REFERENCE TO RELATED APPLICATIONS

This application is a Continuation of application Ser. No. 11/312,728, filed Dec. 20, 2005, which is currently pending.

BACKGROUND OF THE INVENTION

The present invention relates to a staged combustion system in which the production of undesirable combustion product components is minimized over the engine operating regime and, more particularly, to a pilot mixer for such staged combustion system having a fuel nozzle with an increased fuel flow and a desired atomization of fuel droplets.

Air pollution concerns worldwide have led to stricter emissions standards both domestically and internationally. Aircraft are governed by both Environmental Protection Agency (EPA) and International Civil Aviation Organization (ICAO) standards. These standards regulate the emission of oxides of nitrogen (NOx), unburned hydrocarbons (HC), and carbon monoxide (CO) from aircraft in the vicinity of airports, where they contribute to urban photochemical smog problems. Such standards are driving the design of gas turbine engine combustors, which also must be able to accommodate the desire for efficient, low cost operation and reduced fuel consumption. In addition, the engine output must be maintained or even increased.

It will be appreciated that engine emissions generally fall into two classes: those formed because of high flame temperatures (NOx) and those formed because of low flame temperatures which do not allow the fuel-air reaction to proceed to completion (HC and CO). Balancing the operation of a combustor to allow efficient thermal operation of the engine, while simultaneously minimizing the production of undesirable combustion products, is difficult to achieve. In that regard, operating at low combustion temperatures to lower the emissions of NOx can also result in incomplete or partially incomplete combustion, which can lead to the production of excessive amounts of HC and CO, as well as lower power output and lower thermal efficiency. High combustion temperature, on the other hand, improves thermal efficiency and lowers the amount of HC and CO, but oftentimes results in a higher output of NOx.

One way of minimizing the emission of undesirable gas turbine engine combustion products has been through staged combustion. In such an arrangement, the combustor is provided with a first stage burner for low speed and low power conditions so the character of the combustion products is more closely controlled. A combination of first and second stage burners is provided for higher power output conditions, which attempts to maintain the combustion products within the emissions limits.

One mixer design that has been utilized is known as a twin annular premixing swirler (TAPS), which is disclosed in the following U.S. Pat. Nos. 6,354,072; 6,363,726; 6,367,262; 6,381,964; 6,389,815; 6,418,726; 6,453,660; 6,484,489; and, 6,865,889. Published U.S. patent application 2002/0178732 also depicts certain embodiments of the TAPS mixer. It will be understood that the TAPS mixer assembly includes a pilot mixer which is supplied with fuel during the entire engine operating cycle and a main mixer which is supplied with fuel only during increased power conditions of the engine operating cycle.

Currently, the pilot mixer of the TAPS mixer assembly has utilized an Airblast-Simplex ("ABS") type fuel nozzle for providing fuel therein. An exemplary ABS fuel nozzle is disclosed in U.S. Pat. No. 5,224,333 to Bretz et al. It will be appreciated that the ABS injector uses a combination of fuel pressure drop and airblast effect for both pre-filming and atomizing the fuel. The reliance on fuel pressure drop, however, reduces the fuel flow range possible within the limits of pump capacity at high flows. It has been found that the spray stability and atomization quality of the fuel at low flows for the ABS fuel injector is also reduced. These characteristics become even more important as the pressure ratio in gas turbine engines become greater.

Thus, there is a need to provide a mixer assembly for a gas turbine engine where the fuel injectors of the pilot mixer have an increased fuel flow range by improving the fuel flow number. In addition, it is desired that the increase in fuel flow number would not sacrifice spray stability and atomization quality of the injected fuel at low flow conditions. At the same time, any increase in susceptibility to coking for the fuel injectors would be addressed.

BRIEF SUMMARY OF THE INVENTION

According to one aspect of the invention, a mixer for a gas turbine engine combustor includes: (a) a primary fuel injector with upstream and downstream ends, the primary fuel injector including: (1) a hollow central portion configured to pass a first air stream; (2) an annular fuel passage at the downstream end, configured to discharge an annular first fuel stream surrounding the first air stream; (b) an annular splitter surrounding the primary fuel injector, configured to pass a second air stream surrounding the first fuel stream; (c) an annular first housing surrounding the splitter, and having an exit positioned axially downstream of the primary fuel injector and the splitter; and (d) fuel injection ports disposed in an array outside the first housing, and disposed in communication with a fuel supply and positioned to discharge a second fuel stream into a third air stream at a position axially upstream of the exit of the first housing.

DETAILED DESCRIPTION OF THE INVENTION

Figure 1:
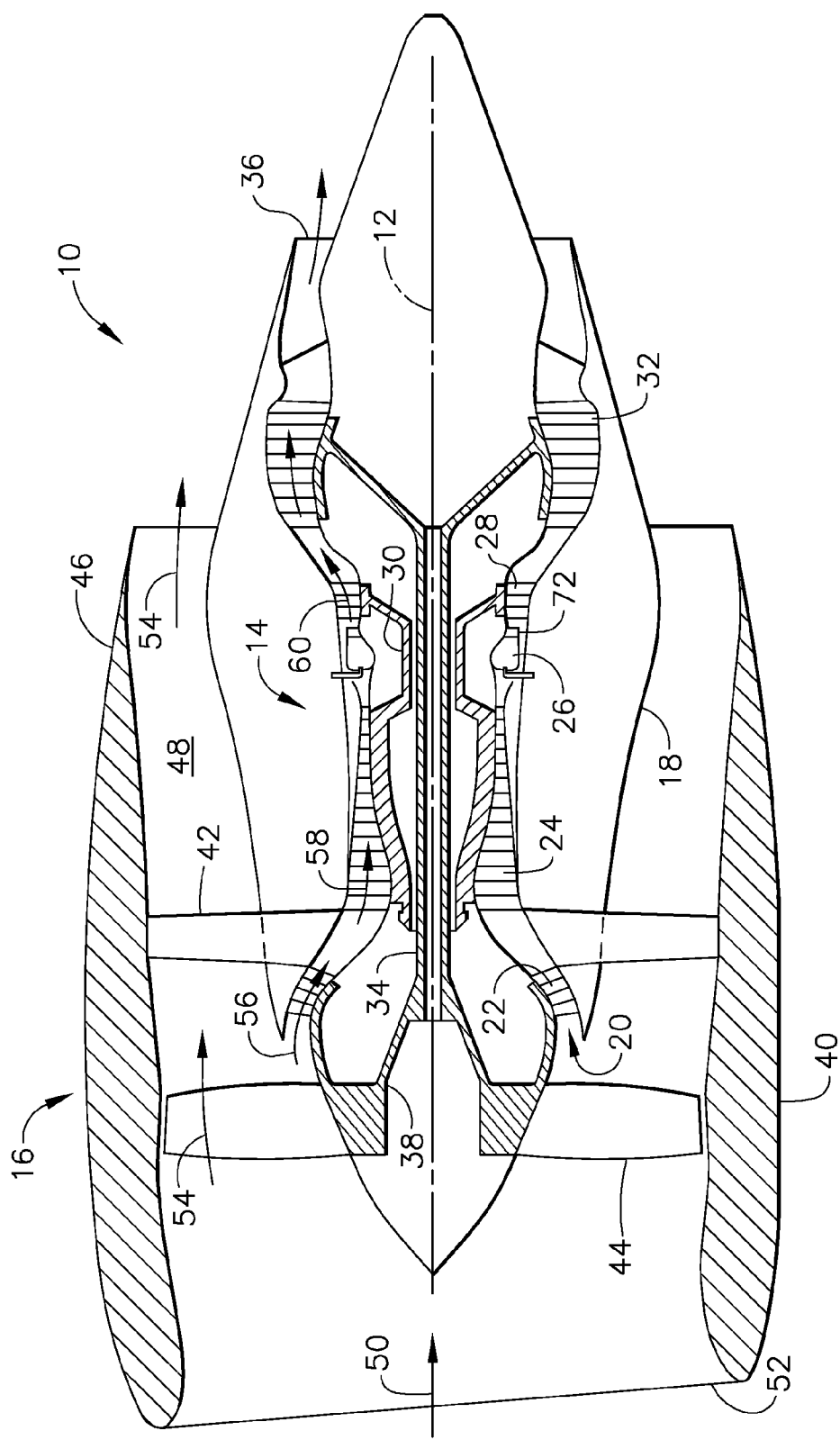
FIG. 1 is a diagrammatic view of a high bypass turbofan gas turbine engine.

Referring now to the drawings in detail, wherein identical numerals indicate the same elements throughout the figures, FIG. 1 depicts in diagrammatic form an exemplary gas turbine engine 10 (high bypass type) utilized with aircraft having a longitudinal or axial centerline axis 12 therethrough for reference purposes. Engine 10 preferably includes a core gas turbine engine generally identified by numeral 14 and a fan section 16 positioned upstream thereof. Core engine 14 typically includes a generally tubular outer casing 18 that defines an annular inlet 20. Outer casing 18 further encloses and supports a booster compressor 22 for raising the pressure of the air that enters core engine 14 to a first pressure level. A high pressure, multi-stage, axial-flow compressor 24 receives pressurized air from booster 22 and further increases the pressure of the air. The pressurized air flows to a combustor 26, where fuel is injected into the pressurized air stream to raise the temperature and energy level of the pressurized air. The high energy combustion products flow from combustor 26 to a first (high pressure) turbine 28 for driving high pressure compressor 24 through a first (high pressure) drive shaft 30, and then to a second (low pressure) turbine 32 for driving booster compressor 22 and fan section 16 through a second (low pressure) drive shaft 34 that is coaxial with first drive shaft 30. After driving each of turbines 28 and 32, the combustion products leave core engine 14 through an exhaust nozzle 36 to provide propulsive jet thrust.

Fan section 16 includes a rotatable, axial-flow fan rotor 38 that is surrounded by an annular fan casing 40. It will be appreciated that fan casing 40 is supported from core engine 14 by a plurality of substantially radially-extending, circumferentially-spaced outlet guide vanes 42. In this way, fan casing 40 encloses fan rotor 38 and fan rotor blades 44. Downstream section 46 of fan casing 40 extends over an outer portion of core engine 14 to define a secondary, or bypass, airflow conduit 48 that provides additional propulsive jet thrust.

From a flow standpoint, it will be appreciated that an initial air flow, represented by arrow 50, enters gas turbine engine 10 through an inlet 52 to fan casing 40. Air flow 50 passes through fan blades 44 and splits into a first compressed air flow (represented by arrow 54) that moves through conduit 48 and a second compressed air flow (represented by arrow 56) which enters booster compressor 22. The pressure of second compressed air flow 56 is increased and enters high pressure compressor 24, as represented by arrow 58. After mixing with fuel and being combusted in combustor 26, combustion products 60 exit combustor 26 and flow through first turbine 28.

Combustion products 60 then flow through second turbine 32 and exit exhaust nozzle 36 to provide thrust for gas turbine engine 10.

Figure 2:
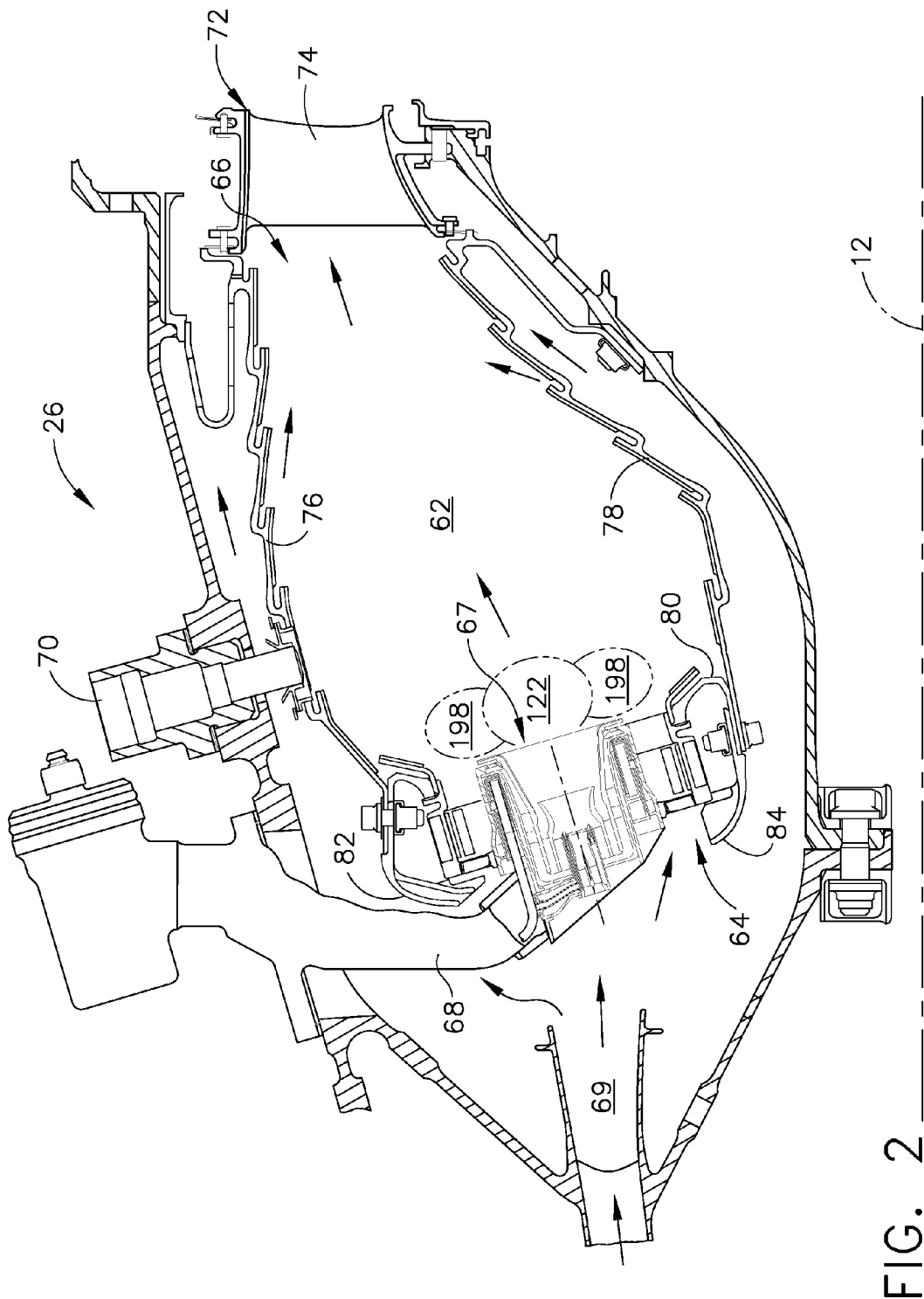
FIG. 2 is a longitudinal, cross-sectional view of a gas turbine engine combustor having a staged arrangement.

As best seen in FIG. 2, combustor 26 includes an annular combustion chamber 62 that is coaxial with longitudinal axis 12, as well as an inlet 64 and an outlet 66. As noted above, combustor 26 receives an annular stream of pressurized air from a high pressure compressor discharge outlet 69. A portion of this compressor discharge air flows into a mixing assembly 67, where fuel is also injected from a fuel nozzle 68 to mix with the air and form a fuel-air mixture that is provided to combustion chamber 62 for combustion. Ignition of the fuel-air mixture is accomplished by a suitable igniter 70, and the resulting combustion gases 60 flow in an axial direction toward and into an annular, first stage turbine nozzle 72. Nozzle 72 is defined by an annular flow channel that includes a plurality of radially-extending, circularly-spaced nozzle vanes 74 that turn the gases so that they flow angularly and impinge upon the first stage turbine blades of first turbine 28. As shown in FIG. 1, first turbine 28 preferably rotates high pressure compressor 24 via first drive shaft 30. Low pressure turbine 32 preferably drives booster compressor 24 and fan rotor 38 via second drive shaft 34.

Combustion chamber 62 is housed within engine outer casing 18 and is defined by an annular combustor outer liner 76 and a radially-inwardly positioned annular combustor inner liner 78. The arrows in FIG. 2 show the directions in which compressor discharge air flows within combustor 26. As shown, part of the air flows over the outermost surface of outer liner 76, part flows into combustion chamber 62, and part flows over the innermost surface of inner liner 78.

Contrary to previous designs, it is preferred that outer and inner liners 76 and 78, respectively, not be provided with a plurality of dilution openings to allow additional air to enter combustion chamber 62 for completion of the combustion process before the combustion products enter turbine nozzle 72. This is in accordance with a patent application entitled "High Pressure Gas Turbine Engine Having Reduced Emissions" and having Ser. No. 11/188,483, which is also owned by the assignee of the present invention. It will be understood, however, that outer liner 76 and inner liner 78 preferably include a plurality of smaller, circularly-spaced cooling air apertures (not shown) for allowing some of the air that flows along the outermost surfaces thereof to flow into the interior of combustion chamber 62. Those inwardly-directed air flows pass along the inner surfaces of outer and inner liners 76 and 78 that face the interior of combustion chamber 62 so that a film of cooling air is provided therealong.

It will be understood that a plurality of axially-extending mixing assemblies 67 are disposed in a circular array at the upstream end of combustor 26 and extend into inlet 64 of annular combustion chamber 62. It will be seen that an annular dome plate 80 extends inwardly and forwardly to define an upstream end of combustion chamber 62 and has a plurality of circumferentially spaced openings formed therein for receiving mixing assemblies 67. For their part, upstream portions of each of inner and outer liners 76 and 78, respectively, are spaced from each other in a radial direction and define an outer cowl 82 and an inner cowl 84. The spacing between the forwardmost ends of outer and inner cowls 82 and 84 defines combustion chamber inlet 64 to provide an opening to allow compressor discharge air to enter combustion chamber 62.

Figure 3:
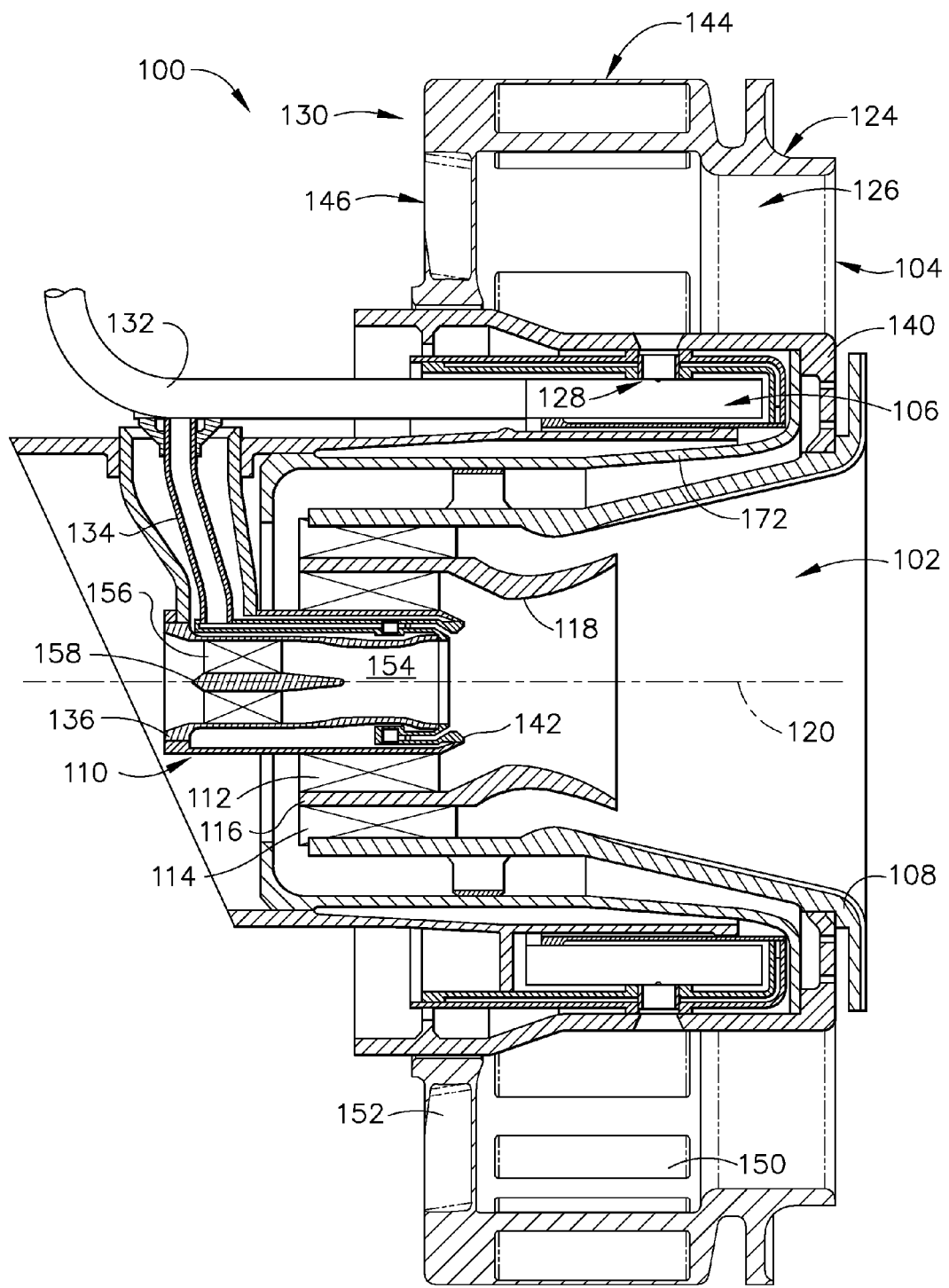
FIG. 3 is an enlarged, cross-sectional view of the mixer assembly depicted in FIG. 2.

A mixing assembly 100 in accordance with one embodiment of the present invention is shown in FIG. 3. Mixing assembly 100 preferably includes a pilot mixer 102, a main mixer 104, and a fuel manifold 106 positioned therebetween. More specifically, it will be seen that pilot mixer 102 preferably includes an annular pilot housing 108 having a hollow interior, as well as a pilot fuel injector 110 mounted in housing 108 and adapted for dispensing droplets of fuel to the hollow interior of pilot housing 108. Further, pilot mixer 102 preferably includes a first swirler 112 located at a radially inner position adjacent pilot fuel injector 110, a second swirler 114 located at a radially outer position from first swirler 112, and a splitter 116 positioned therebetween. Splitter 116 extends downstream of pilot fuel injector 110 to form a venturi 118 at a downstream portion. It will be understood that first and second pilot swirlers 112 and 114 are generally oriented parallel to a centerline axis 120 through mixing assembly 100 and include a plurality of vanes for swirling air traveling therethrough. Fuel and air are provided to pilot mixer 102 at all times during the engine operating cycle so that a primary combustion zone 122 is produced within a central portion of combustion chamber 62 (see FIG. 2).

Main mixer 104 further includes an annular main housing 124 radially surrounding pilot housing 108 and defining an annular cavity 126, a plurality of fuel injection ports 128 which introduce fuel into annular cavity 126, and a swirler arrangement identified generally by numeral 130. Swirler arrangement 130 may be configured in any of several ways, as seen in U.S. Pat. No. 7,581,396 entitled "Mixer Assembly For Combustor Of A Gas Turbine Engine Having A Plurality Of Counter-Rotating Swirlers" and U.S. Pat. No. 7,565,803 entitled "Swirler Arrangement For Mixer Assembly Of A Gas Turbine Engine Combustor Having Shaped Passages", both of which are assigned to the owner of the present invention. It will be seen in FIG. 3, however, that swirler arrangement 130 preferably includes at least a first swirler 144 positioned upstream from fuel injection ports 128. As shown, first swirler 144 is preferably oriented substantially radially to centerline axis 120 through mixer assembly 100. It will be noted that first swirler 144 includes a plurality of vanes 150 for swirling the air flowing therebetween. Since vanes 150 are substantially uniformly spaced circumferentially, a plurality of substantially uniform passages are defined between adjacent vanes 150. It will further be understood that swirler 144 may include vanes having different configurations so as to shape the passages in a desirable manner, as disclosed in the '803 Patent identified hereinabove.

Swirler arrangement 130 also is shown as including a second swirler 146 positioned upstream from fuel injection ports 128 and preferably oriented substantially parallel to centerline axis 120. Second swirler 146 further includes a plurality of vanes 152 for swirling the air flowing therebetween. Although vanes 152 are shown as being substantially uniformly spaced circumferentially, thereby defining a plurality of substantially uniform passages therebetween, such vanes 152 may also have different configurations so as to shape the passages in a desirably manner.

Fuel manifold 106, as stated above, is located between pilot mixer 102 and main mixer 104 and is in flow communication with a fuel supply. In particular, an outer radial wall of a centerbody outer shell 140 forms an outer surface of fuel manifold 106, and a shroud member 172 is configured to provide an inner surface and an aft surface thereof. Fuel injection ports 128 are in flow communication with fuel manifold 106 and spaced circumferentially around centerbody outer shell 140. As seen in FIG. 3, fuel injection ports 128 are preferably positioned so that fuel is provided in an upstream end of annular cavity 126.

When fuel is provided to main mixer 104, an annular, secondary combustion zone 198 is provided in combustion chamber 62 that is radially outwardly spaced from and concentrically surrounds primary combustion zone 122. Depending upon the size of gas turbine engine 10, as many as twenty or so mixer assemblies 100 can be disposed in a circular array at inlet 64 of combustion chamber 62.

Figure 4:
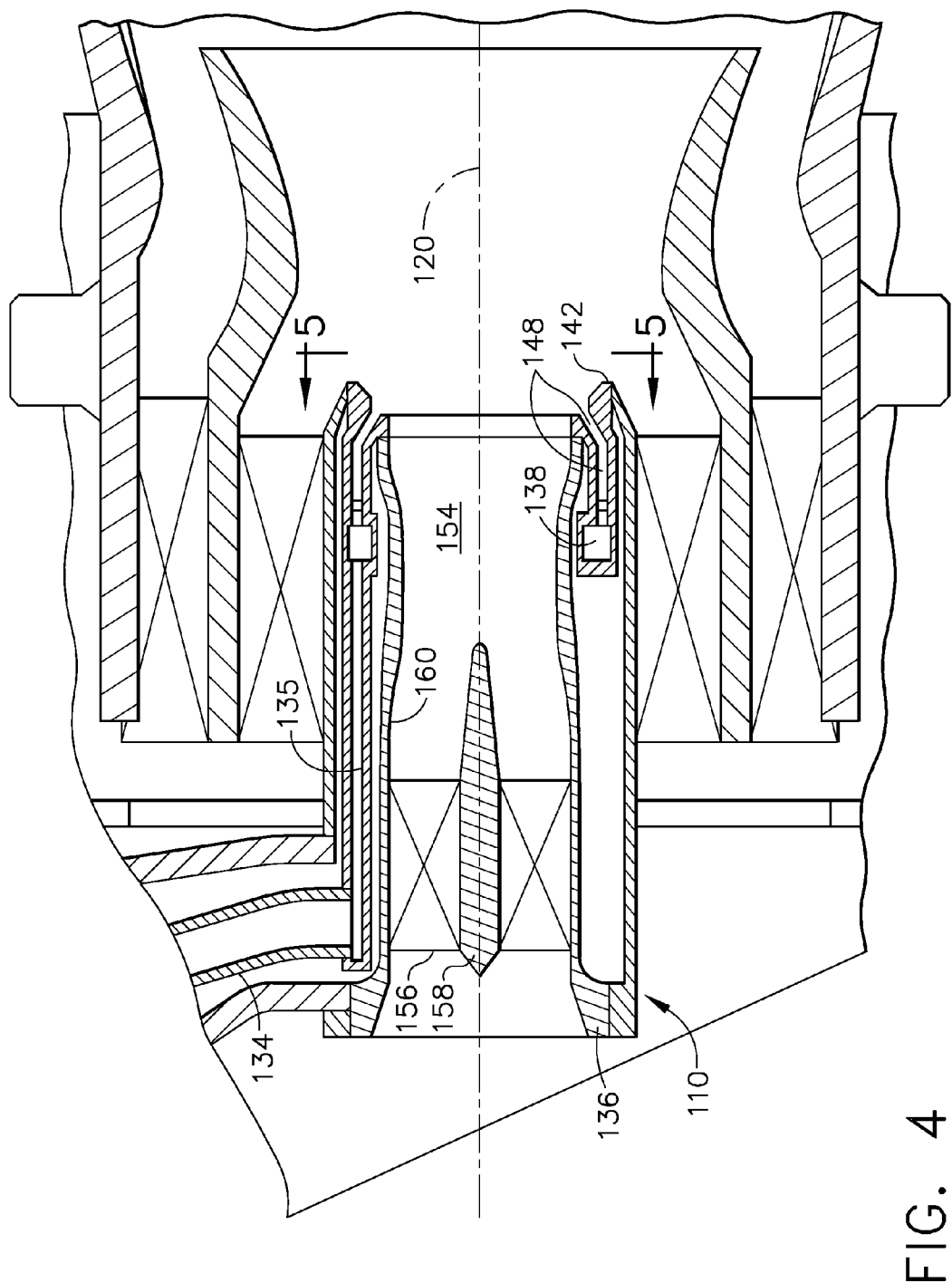
FIG. 4 is an enlarged, cross-sectional view of a Pure Airblast fuel injector provided in the pilot mixer of the mixer assembly depicted in FIGS. 2 and 3.
Figure 5:
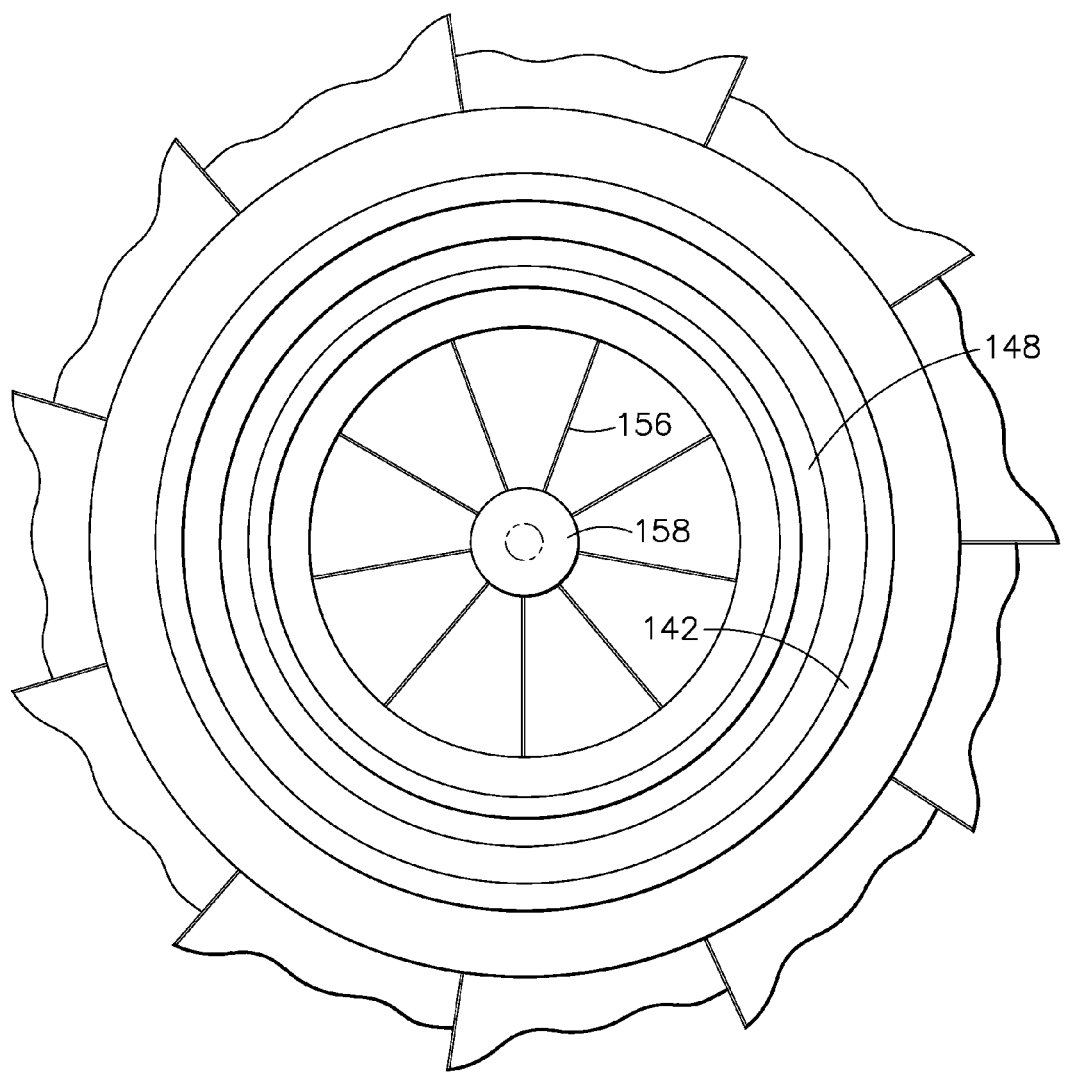
FIG. 5 is an aft view of the pilot fuel injector depicted in FIG. 4.

As best seen in FIGS. 3 and 4, pilot fuel injector 110 is preferably a Pure Airblast (PAB) type, where pre-filming and atomization of the fuel provided thereby is performed almost exclusively by blasting air at the fuel. In this way, the kinetic energy of the air stream is utilized instead of relying solely on the hydraulic energy of the fuel stream. More specifically, it will be seen that fuel is provided by a fuel tube 132 in flow communication with a fuel source (not shown) to a conduit 134 at an upstream end 136 of pilot fuel injector 110. A passage 135 connected to conduit 134 is in flow communication with an annular manifold 138, which is preferably located adjacent a downstream end 142 of such pilot fuel injector 110, so that annular manifold 138 is in flow communication with conduit 134 and fuel tube 132. It will be appreciated from FIG. 5 that fuel is injected from manifold 138 in a ring at downstream end 142, although a plurality of separate, individual passages may alternatively extend from manifold 138. In order to provide additional atomization of the fuel, an annular swirler may be positioned within an annular passage 148 between manifold 138 and downstream end 142.

Contrary to the ABS-type fuel injector, the Pure Airblast injector provides compressed air through a central hollow portion 154 thereof A plurality of swirlers 156 are circumferentially spaced around a centerbody 158 and are preferably incorporated into hollow portion 154 to accentuate the air flow through pilot fuel injector 110. In this way, the air flow blasts the ring of fuel provided at downstream end 142 with swirled air. It will be appreciated that swirlers 156 may be configured so as to swirl air in the same direction or in opposite directions as the fuel is injected.

This configuration for pilot fuel injector 110 permits a higher (i.e., faster) fuel flow than in prior designs, preferably having a flow number greater than about 10 and optimally greater than about 12. Such fuel flow permits greater fuel capacity, which is required for gas turbine engines having a pressure ratio greater than approximately 30. It will be understood that the flow number of pilot fuel injector 110 is a parameter which is calculated by the flow rate divided by the square root of a change in pressure $$\left(\frac{Wf}{\sqrt{\Delta p}}\right).$$

Further, the maximum change in fuel pressure in pilot fuel injector 110 (i.e., maximum pressure drop) is preferably less than about 1000 pounds per square inch differential (psid) and more preferably less than about 700 psid. At the same time, the minimum change in fuel pressure (at low fuel flows) is preferably greater than about 1.0 psid and more preferably greater than about 4.0 psid.

It will be appreciated that film stability and atomization of the fuel are also important parameters and must maintain desired levels so that an approximately annular film is achieved. In particular, the film stability limit of pilot fuel injector 110 is preferably less than approximately 2.0 and more preferably less than approximately 0.5. The size of the fuel droplets upon atomization are preferably less than approximately 75 Sauter Mean Diameter (SMD) and more preferably less than approximately 50 SMD.

It has been found, however, that utilizing a PAB fuel injector 110 for pilot fuel nozzle 102 does increase the susceptibility of it to coking since downstream end 142 thereof has a larger area (compared to previous injectors) exposed to hot air flow. This is particularly applicable to the area in annular passage 148 and manifold 138 of pilot fuel injector 110. In order to minimize these concerns, a heat shield 160 is preferably incorporated into pilot fuel injector 110 to provide thermal insulation.

Figure 6:
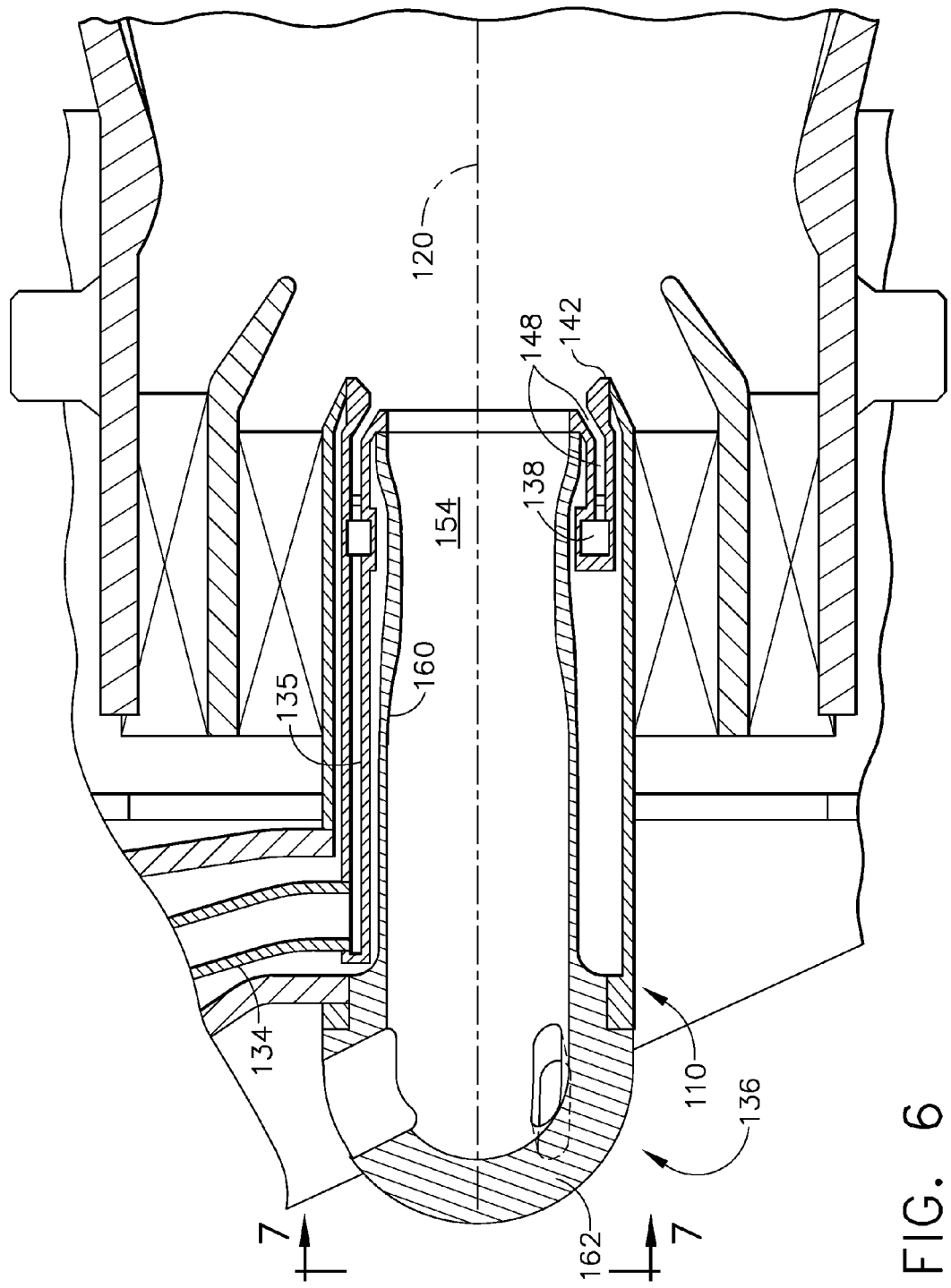
FIG. 6 is an enlarged, cross-sectional view of an alternate embodiment of the fuel injector provided in the pilot mixer of the mixer assembly depicted in FIGS. 2-5.
Figure 7:
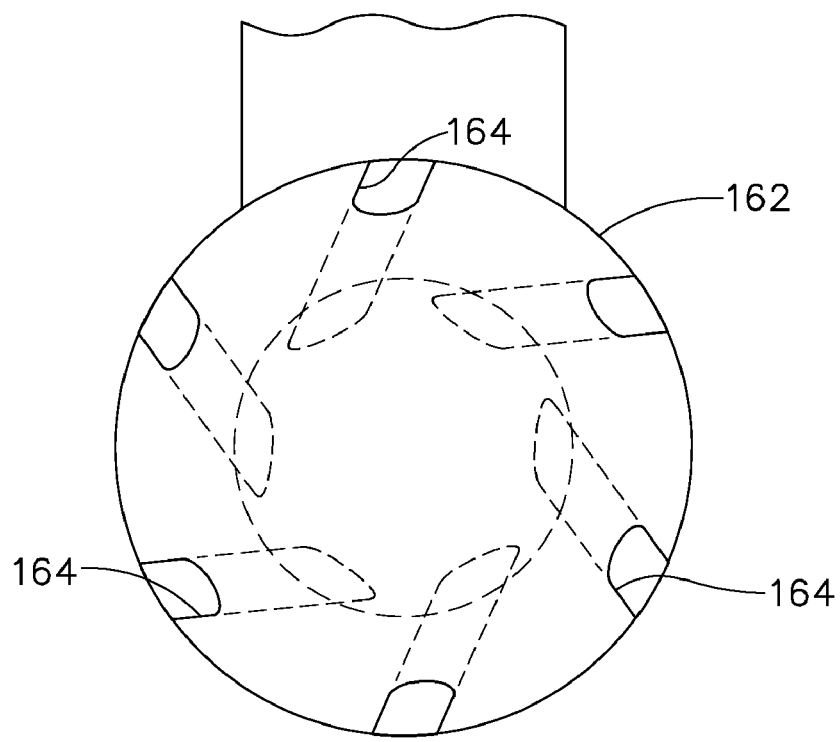
FIG. 7 is a partial front view of the fuel injector depicted in FIG. 6 taken along line 7-7; and, FIG. 8 is a partial cross-sectional view of the fuel injector depicted in FIG. 6.

As seen in an alternate embodiment depicted in FIG. 6, it will be appreciated that a plurality of radial swirlers 162 (i.e., substantially perpendicular to centerline axis 120) are provided to swirl air flowing through hollow portion 154 of pilot fuel injector 110. In this configuration, potential wakes from the smaller axial swirlers 156 are able to be eliminated. More specifically, it will be seen from FIG. 7 that at least about three swirl ports 164 (e.g., holes or slots) are provided in radial swirlers 162. Swirl ports 164 are sized to meet solidity concerns and to turn the flow of air into hollow portion 154. It is preferred that at least a minimum amount of front facing area (i.e., frontal capture area) for such slots 164 be provided to permit some recovery of dynamic pressure therein.

Since pilot fuel injector 110 is able to better control the mixing between swirlers 112 and 114, as well as prevent the flame from combustion chamber 62 from reaching downstream end 142 thereof it will be appreciated that splitter 116 may be shortened to eliminate venturi 118. Accordingly, extraneous metal may be removed which helps to reduce both weight and cost. Additionally, the potential for external coking and/or thermal distress is reduced.

Figure 8:
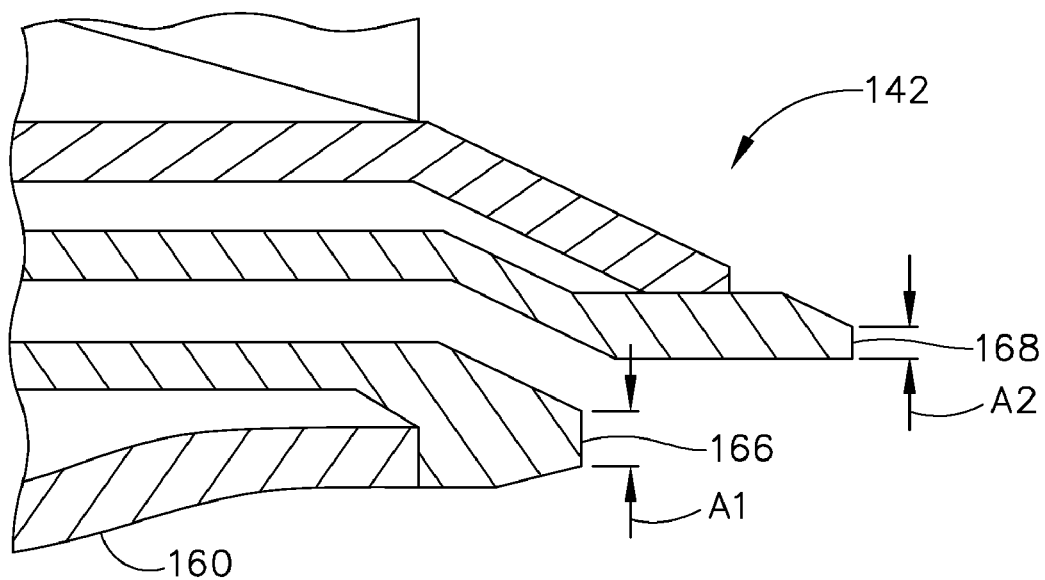

It will further be appreciated from FIG. 8 that the configuration of downstream end 142 of pilot fuel injector 110, otherwise known as the fuel prefilmer, may be modified so as to minimize the heights A1 and A2 of aft faces 166 and 168, respectively. Such configuration may or may not include a divergent conical surface. This is yet another advantage of employing a Pure Airblast type injector.

Although particular embodiments of the present invention have been illustrated and described, it will be apparent to those skilled in the art that various changes and modifications can be made without departing from the spirit of the present invention. Accordingly, it is intended to encompass within the appended claims all such changes and modification that fall within the scope of the present invention.

What is claimed is:

1. A mixer apparatus for a gas turbine engine combustor, comprising:
  (a) a generally cylindrical primary fuel injector with upstream and downstream ends, the primary fuel injector including:
    (1) a hollow central portion configured to pass a first air stream therethrough;
    (2) an annular fuel passage positioned at the downstream end of the primary fuel injector, the fuel passage configured to discharge an annular first fuel stream surrounding the first air stream;
  (b) an annular splitter surrounding the primary fuel injector, the splitter configured to pass a second air stream surrounding the first fuel stream;
  (c) an annular first housing surrounding the primary fuel injector and the splitter, the first housing having an exit positioned axially downstream of the primary fuel injector and the splitter; and
  (d) a plurality of fuel injection ports positioned in a radial array outside the first housing, the fuel injection ports disposed in communication with a fuel supply and positioned to discharge a second fuel stream into a third air stream at a position axially upstream of the exit of the first housing.

2. The apparatus of claim 1 wherein an annular swirler is positioned within the annular fuel passage.

3. The apparatus of claim 1 wherein the primary fuel injector includes a plurality of swirlers at an upstream end of the hollow central portion.

4. The apparatus of claim 3 wherein the swirlers are substantially parallel to a central axis through the primary fuel injector.

5. The apparatus of claim 3 wherein the swirlers are substantially perpendicular to a central axis through the primary fuel injector.

6. The apparatus of claim 1 wherein an annular flowpath for channeling a third air stream is defined between an exterior surface of the splitter and an interior surface of the first housing.

7. The apparatus of claim 6 wherein a swirler is positioned within the annular flowpath.

8. The apparatus of claim 1 further comprising an outer shell surrounding the first housing, where the fuel injection ports pass through the outer shell, and each of the fuel injection ports communicates with a fuel manifold positioned between the first housing and the outer shell.

9. The apparatus of claim 1 further comprising an annular second housing surrounding the first housing, the second housing radially spaced away from the first housing to define an annular cavity configured to pass the third air stream therethrough.

10. The apparatus of claim 1 wherein an axial-flow swirler is positioned at an upstream end of the second housing.

11. The apparatus of claim 1 wherein a radial-flow swirler is positioned around the periphery of the second housing.

* * * * *